United States Patent [19]
Aronne

[11] Patent Number: 5,072,727
[45] Date of Patent: Dec. 17, 1991

[54] MULTI-PURPOSE JERKIN

[75] Inventor: Armand J. Aronne, Massapequa, N.Y.

[73] Assignee: Grumman Aerospace Corporation, Bethpage, N.Y.

[21] Appl. No.: 522,500

[22] Filed: May 10, 1990

Related U.S. Application Data

[63] Continuation of Ser. No. 202,636, Jun. 6, 1988, abandoned.

[51] Int. Cl.⁵ .............................................. A62B 17/00
[52] U.S. Cl. ........................... 128/202.11; 128/202.19
[58] Field of Search ....................... 128/202.11, 202.19

[56] References Cited

U.S. PATENT DOCUMENTS

| | | |
|---|---|---|
| 2,114,301 | 4/1938 | Harrigan . |
| 2,222,903 | 11/1940 | Hart . |
| 2,318,673 | 5/1943 | Coleman . |
| 2,380,372 | 7/1945 | Alderfer ............................. 244/148 |
| 2,414,051 | 1/1947 | Mallory . |
| 2,467,037 | 4/1949 | Kajdan ............................. 244/148 |
| 2,475,479 | 7/1949 | Clark et al. . |
| 2,495,316 | 1/1950 | Clark et al. . |
| 2,871,849 | 2/1959 | Chatham et al. . |
| 2,886,027 | 5/1959 | Henry . |
| 2,992,798 | 7/1961 | Smith et al. ...................... 244/138 R |
| 3,000,010 | 9/1961 | Rich . |
| 3,016,218 | 1/1962 | Sepp, Jr. . |
| 3,107,370 | 10/1963 | Gaylord . |
| 3,436,037 | 4/1969 | Stanley . |
| 3,461,855 | 8/1969 | Brown et al. . |
| 3,519,223 | 7/1970 | Poehlmann et al. . |
| 3,523,301 | 8/1970 | Davis et al. ......................... 2/2.1 A |
| 3,602,463 | 8/1971 | Koochembere . |
| 3,635,216 | 1/1972 | Curtis . |
| 3,690,604 | 9/1972 | Guilfoyle . |
| 3,751,727 | 8/1973 | Shepard et al. . |
| 3,757,371 | 9/1973 | Martin . |
| 4,146,933 | 4/1979 | Jenkins et al. . |
| 4,455,685 | 6/1984 | Steffler et al. . |
| 4,583,522 | 4/1986 | Aronne . |

FOREIGN PATENT DOCUMENTS 835003 2/1970 Canada .

OTHER PUBLICATIONS

"USAF Tests New Parachute System for Combat Aircraft", Aviation Week & Space Technology, Aug. 11, 1986, p. 61.

Primary Examiner—Aaron J. Lewis
Attorney, Agent, or Firm—Pollock, VandeSande & Priddy

[57] ABSTRACT

A multi-purpose protective garment is provided for aviators and astronauts. The garment includes inflatable pads which selectively exert pressure on the chest and abdominal areas of the wearer to counteract the effects of high altitude and high G forces which have detrimental effects upon an aviator. The garment includes an integral harness for easily attaching a hollowed backpack frame which not only contains a stored parachute but serves as an oxygen bottle for inflation of the pads as well as providing an emergency oxygen supply for the wearer.

4 Claims, 3 Drawing Sheets

1

MULTI-PURPOSE JERKIN

This application is a continuation of application Ser. No. 202,636, filed June 6, 1988, now abandoned.

FIELD OF THE INVENTION

The present invention relates to safety garments for aviators and astronauts, and more particularly to a pressurizeable garment known as a jerkin.

BACKGROUND OF THE INVENTION

Astronauts and military aviators flying high-speed aircraft must be prepared to face emergency situations when cabin or cockpit environment becomes drastically altered. For example, if cabin or cockpit pressure is lost at extremely high altitudes or in outer space, breathing becomes difficult due to distention of the chest. Another problem which can be encountered is excessive G-forces which cause pooling of blood within the abdominal area of the pilot or astronaut. As a consequence, an individual may encounter loss of consciousness.

In the past, a number of separate approaches has been adopted to preclude the effects of either of these emergencies from taking their toll. However, such approaches involved cluttering a cockpit or space vehicle cabin with cumbersome and heavy equipment which is obviously a definite detriment. Furthermore, much of the prior art equipment for countering the discussed emergency situations is not portable and can therefore be useless in the event of pilot egress from a plane or space craft.

BRIEF DESCRIPTION OF THE INVENTION

The present invention solves the aforementioned problems in a convenient, safe, and cost-effective manner. The present invention is directed to a protective garment known as a jerkin which is inflatable, as will be discussed. However, the jerkin is fabricated as an exposure suit so that a pilot or astronaut may receive the benefits from a protective garment in a hostile environment, which can include chemical warfare threats.

In addition, the jerkin design of the present invention is adapted for mounting an integrated parachute backpack. Consequently, the present invention offers a novel and imaginative garment which includes structure necessary to accomplish a host of safety features. In addition, the present garment is so constructed as to incorporate a ventilation system to keep an aviator comfortable during operational flight time.

Other features of the present invention include easily operated garment closures, such as a zipper, for permitting the garment to be easily doffed and donned. Cuffs about the neck seal against cold water which must be anticipated in the event of an unexpected landing in the ocean.

The garment itself may have a structural harness sewn into it to accommodate parachute and restraint loads. The garment may also be metalized for radar locating capabilities. In addition, helicopter lift rings for rescue and various pockets for communication equipment and survival gear can easily be incorporated into the garment.

BRIEF DESCRIPTION OF THE FIGURES

The above-mentioned objects and advantages of the present invention will be more clearly understood when considered in conjunction with the accompanying drawings, in which.

DETAILED DESCRIPTION OF THE INVENTION

Figure 1:
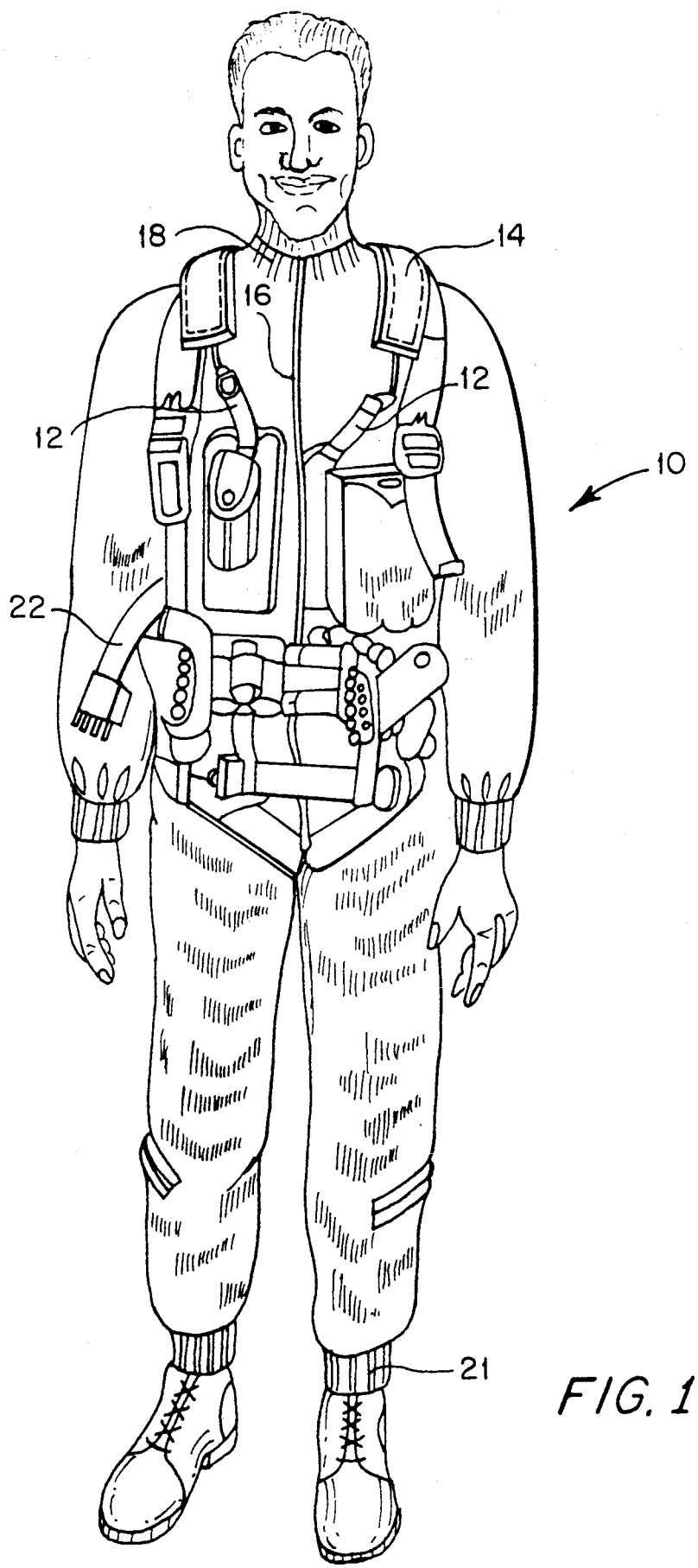
FIG. 1 is an illustration of an aviator equipped with the garment of the present invention.
Figure 3:
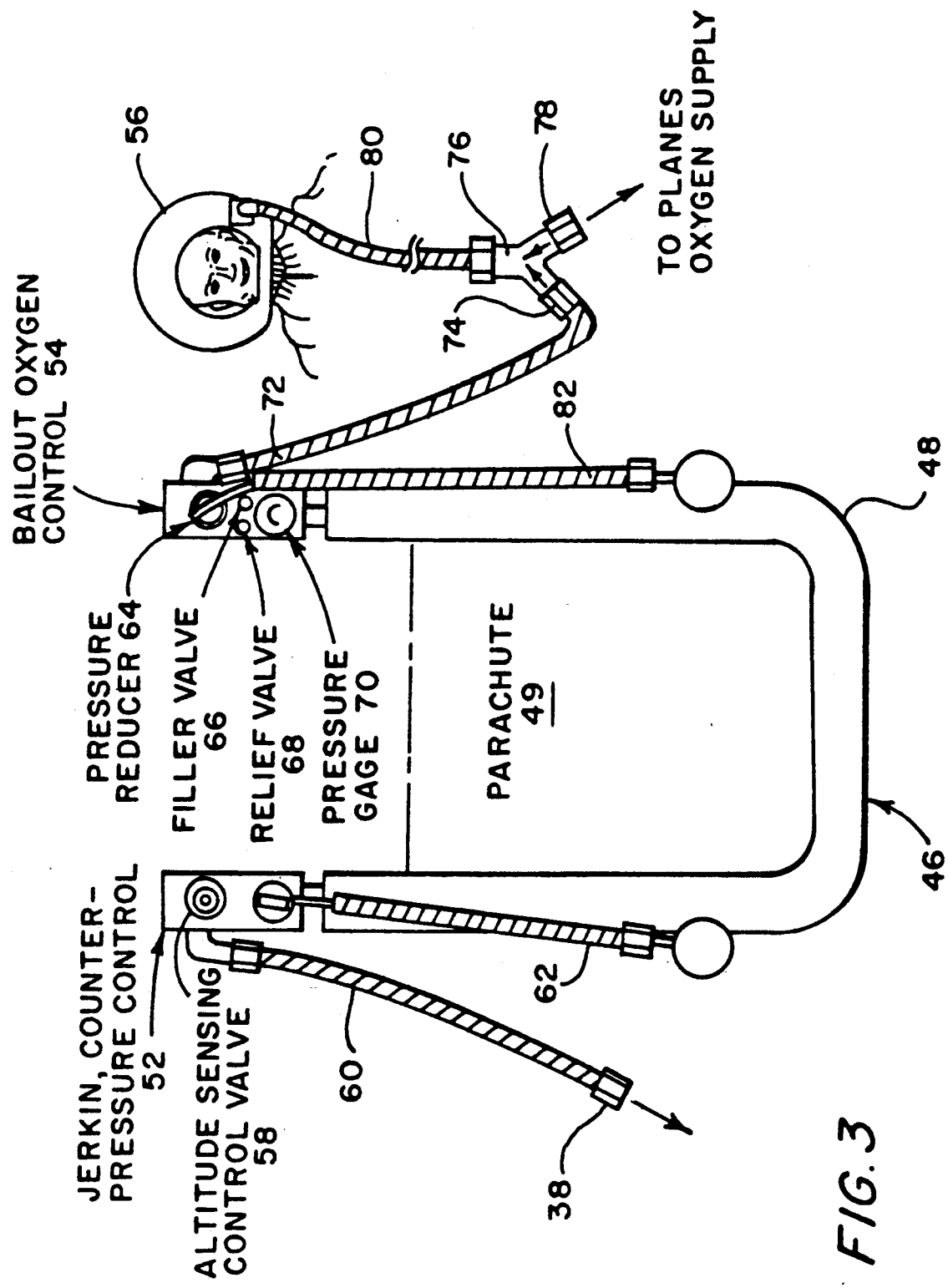
FIG. 3 is a schematic depiction of a backpack structure employed with the present invention.

Referring to FIG. 1, the outer appearance of the present multipurpose jerkin exposure suit is illustrated and generally indication by reference numeral 10. Although it is illustrated as a full-length suit, it is to be understood that, for specific applications, a shorter length in the extremities may be desirable. The material of the suit may be a rubberized fabric, although a host of available materials may be employed. A structural harness 12 may be sewn to the suit for evenly distributing parachute loads. A parachute may be incorporated in a backpack attachment as is seen in FIG. 3 to be discussed hereinafter. The harness of the garment may be made to removably secure backpack attachment straps 14 so that the parachute bearing backpack may be removed when the situation warrants. The garment illustrated in FIG. 1 has a vertical chest zipper 16 to permit rapid doffing and donning of the garment. An elasticized neck band 18, arm cuffs 20 and leg cuffs 21 seal these extremities, thereby offering cold water protection in the event of pilot or astronaut immersion in the sea. The garment may also be provided with an inflatable collar portion so as to act as a safety vest in the event a pilot or aviator parachutes into the sea.

Since independently inflatable pads within the garment must be capable of receiving an air supply from the craft in which a pilot or astronaut is flying, as will be explained, an air supply line 22 extends from the jerkin garment 10.

Figure 2:
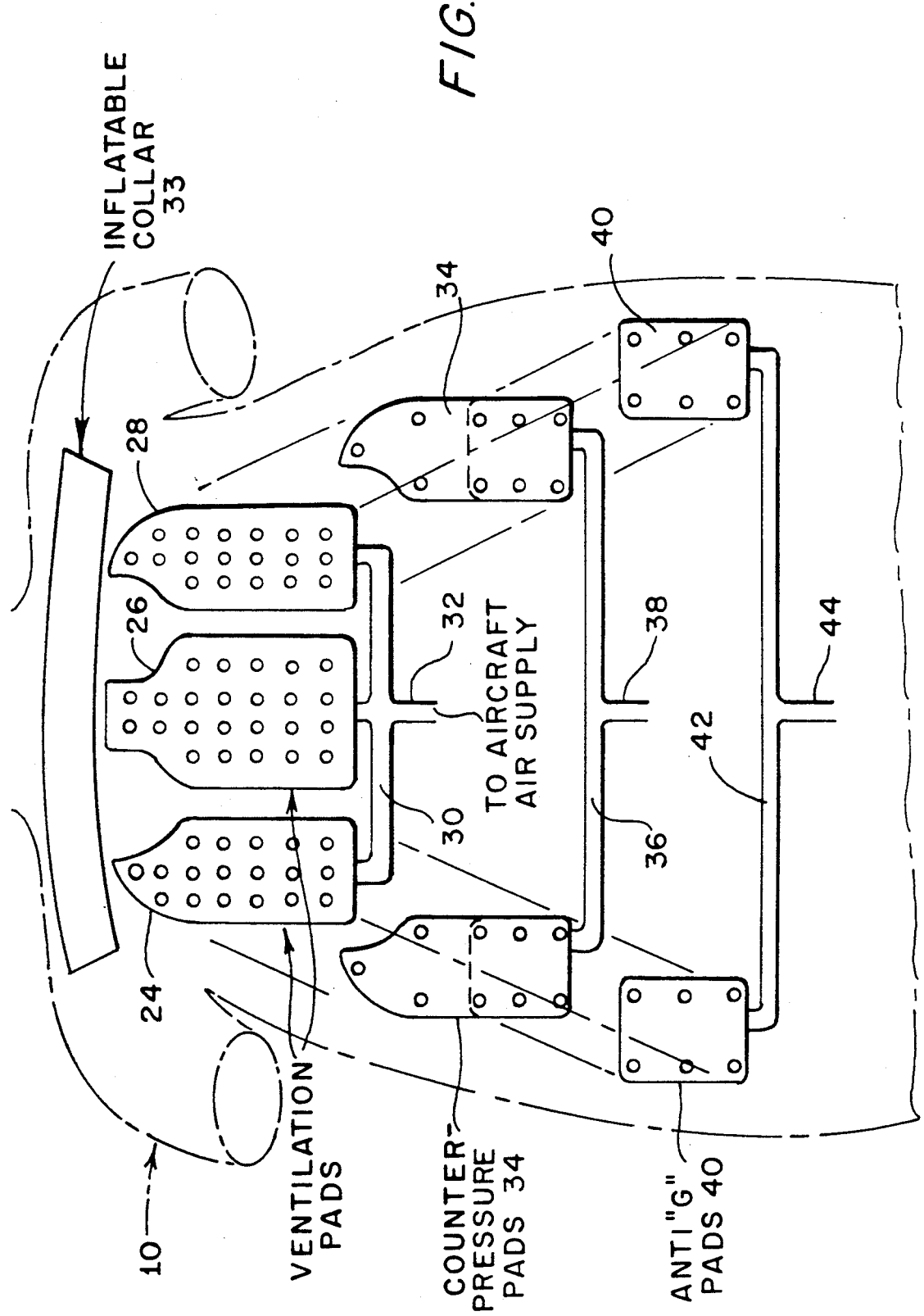
FIG. 2 is a schematic depiction of the inner pressurization components of the present invention.

FIG. 2 is a schematic depiction of the interior garment construction in accordance with the present invention. A first aspect of this construction will be seen to include a forced ventilation system which may include bilateral, inflatable pads 24 and 28 which are adapted to fit over the chest of a wearer. Ventilation for the wearer's back area is provided by a large inflatable back pad 26. The pads may be constructed from flexible plastic material having small perforations therein to allow controlled forced air circulation through the pads. The inlets of the hollowed pads are connected in parallel through inlet tubes 30 that extend to an air supply tube 32 which is connected to the aircraft's air supply via supply line 22 (FIG. 1). Thus, while an aviator or astronaut is seated within his aircraft and wearing the garment, his comfort is enhanced by the forced air system which circulates air through the garment. The air may be allowed to easily exhaust from the garment by means of slightly opening zipper 16 (FIG. 1). The ventilation pads are attachable to the interior of the garment in a number of ways, including their being sewn along pad edges to the interior garment body.

The safety features of the present invention include an inflatable collar 33 which, like the pads, may be sewn into the interior of the garment, preferably about the shoulder and neck areas, so that the wearer's flotation is maximized in the event of his parachuting into the ocean. For additional flotation, the garment may include a closed cell layer of material.

In the event that an aviator's environment becomes depressurized at high altitudes or in space, breathing becomes difficult due to the effect of low pressure surrounding the exterior of his chest. Modern aviator suits provide for pressurizeable pads in the chest area to prevent chest distention and to increase the likelihood of normal breathing. The present jerkin includes such a facility in the nature of counter pressure pads 34 which may be sewn to the garment or attached to the ventilation pads so that they also lie over the wearer's chest area. The counter pressure pads 34 are connected in parallel by tubes 36 to a supply line 38 which, as in the case of conventional systems, provides pressurized air from an emergency aircraft supply via supply line 22 (FIG. 1).

A further safety feature of the present invention is the inclusion of inflatable anti-G pads 40 which operate substantially the same as the counter pressure pads 34 but are disposed in the lower chest and abdominal area of the wearer. Thus, they may be secured to the lower portion of the previously discussed counter pressure pads 34, as indicated by dotted lines. The purpose of the anti-G pads 40 is to provide pressure against the abdominal area in the event that high G forces are encountered by the garment wearer which, without the application of pressure, would cause pooling of blood in the abdominal area thereby likely causing unconsciousness. However, although the construction of the inflatable pad 40 may be similar to that of counter pressure pad 34, it is independently inflatable from the counter pressure pads 34. The pads 40 are interconnected by parallel tubes 42 to a supply line 44 which provides pressurized air from a conventional on-board anti-G system via supply line 22 (FIG. 1).

Thus far explained, the internal construction of the garment is capable of serving as a life vest by virtue of the inflatable collar 33. Further, the perforated ventilation pads described allow the circulation of comfortable air through the interior of the garment. Finally, the counter pressure pads and anti-G pads protect an aviator from constrictive breathing in the event of cabin pressure failure and abdominal blood pooling which could result in unconsciousness.

Referring to FIG. 3 of the drawings, an integral backpack support system is illustrated which cooperates with the interior components of the present garment as just discussed in connection with FIG. 2. This design is an improvment of my co-pending invention disclosed in U.S. Ser. No. 31,549, filed Mar. 30, 1987. FIG. 3 indicates a backpack support 46 which not only supports a folded parachute 49 therein, but also contains a bailout oxygen system for an aviator in addition to a jerkin pressure supply system. The support is seen to include a generally U-shaped tubular frame 48 which not only provides structural support for the various components to be described but also acts as an oxygen bottle. A parachute 49 is folded in a stored condition within the confines of the frame 48. Of course, the frame is covered in an operational state and deployment of the parachute occurs by conventional parachute deployment mechanisms and are therefore not discussed herein. The left illustrated end of the U-shaped frame 48 controls the jerkin counter pressure inflation and it is this control that is generally indicated by reference numeral 52. The control includes an altitude-sensing control valve 58 which is of prior art design, per se. A hose 60 is connected between the valve 58 and supply line 38, the latter also being illustrated in FIG. 2. The control valve senses the ambient pressure surrounding an aviator or astronaut; and in the event the pressure falls below a threshold value, the control valve allows inflation of the counter pressure pads shown in FIG. 2. Of course, if the environment is initially unpressurized, as is the case in modern fighter aircraft, the pressure sensed will be strictly a function of altitude. A pull cord or actuator 62 is connected to the control 52 for permitting emergency or override inflation of the counter pressure pads by an aviator or astronaut.

The illustrated upper right end of the frame 48 is generally indicated as a bailout oxygen control 54 and provides an aviator or astronaut with an oxygen reserve, integrally built into the backpack of FIG. 3 for survival purposes in the event bailout from a craft is necessary. The oxygen control 54 includes a pressure reducer 64 similar to a regulator apparatus for scuba. An oxygen filler valve 66 permits pressurization of the internal volume of hollowed frame 48 and a release valve 68 is provided to control overfill. A built-in pressure gauge 70 may be installed to visually monitor the pressure condition of the oxygen within the hollowed backpack frame 48. A hose 72 is connected between the pressure reducer 64 and a Y connector 76. The purpose of the latter adapter is to normally permit the supply of breathing oxygen from an aircraft or space vehicle oxygen supply to a user via an inlet port 78 of the Y adapter 76. In the event this supply fails, air can be supplied from the bailout oxygen control 54 through a second inlet port 74 of the Y adapter. The outlet port of the connector is connected, via hose 80, to an aviator or astronaut's breathing mask or helmet 56. In order to actuate the emergency breathing reserve, a cord or actuator 82 may be employed. This opens a valve at the outlet of pressure reducer 64 to initiate emergency oxygen supply flow to the Y connector 76. Thus, it will be appreciated that the oxygen supply within a hollowed frame 48 serves to inflate the counter pressure pads (FIG. 2) as well as providing an emergency or bailout oxygen supply as discussed in connection with FIG. 3. These features are, of course, in addition to those discussed in connection with FIGS. 1 and 2 which render the present jerkin in combination with a backpack frame 48 of FIG. 3 a compact, integral exposure garment which satisfies many safety needs of an aviator or astronaut.

It should be understood that the invention is not limited to the exact details of construction shown and described herein for obvious modifications will occur to persons skilled in the art.

I claim:

1. A multi-purpose protective garment for aviators and astronauts comprising:
   a torso portion;
   first inflatable pads attached inside the torso portion for exclusive positioning over a wearer's chest area for exerting pressure only thereon in a low ambient pressure environment;
   second inflatable pads, distinct from the first pads, pressurized independently from the first pads and attached inside the torso portion for exclusive positioning over a wearer's abdominal area for exerting pressure only thereon when the wearer encounters high G forces; and
   a third separately inflatable pad, distinct from the first and second pads, and attached exclusively inside the shoulder area of the torso portion for increasing the floatation of the garment only in an upright condition; and forced air distributing means attached inside the torso portion for distributing forced air through the interior of the torso portion for increasing the comfort of the garment to a wearer.

2. The structure set forth in claim 1 together with a harness attached to the garment for connecting parachute means thereof.

3. A multi-purpose protective garment for aviators and astronauts comprising:

a torso portion;

first inflatable pads attached inside the torso portion for exclusive positioning over a wearer's chest area for exerting pressure only thereon in a low ambient pressure environment;

second separately inflatable pads, distinct from the first pads and attached inside the torso portion for exclusive positioning over a wearer's abdominal area for exerting pressure only thereon when the wearer encounters high G forces; and forced air distributing means attached inside the torso portion for distributing forced air through the interior of the torso portion for increasing the comfort of the garment to a wearer;

third separately inflatable pad, distinct from the first and second pads, and attached exclusively inside the shoulder area of the torso portion for increasing the flotation of the garment only in an upright position;

a harness attached to the garment for connecting parachute means thereto; and a backpack support including a) a generally U-shaped tubular frame having a plurality of straight leg sections;

b) a parachute stored between sections of the frame;

c) first valve means for allowing the frame to be filled with oxygen;

d) second valve means responsive to ambient pressure and mounted to the frame;

e) a hose connected between the second valve means and only the first pads for inflating them with oxygen contained in the frame when the ambient pressure falls below a selected threshold value; and third valve means connected to the frame; and a second hose connected between the third valve means and a breathing apparatus for furnishing a wearer with emergency oxygen contained in the frame.

4. An emergency backpack support for an aviator or astronaut comprising:

a) a generally U-shaped tubular frame having a plurality of straight leg sections;

b) a parachute stored between sections of the frame;

c) first valve means for allowing the frame to be filled with oxygen;

d) second valve means responsive to ambient pressure and mounted to the frame;

e) a hose connected between the second valve means and pressure pads within an exposure suit for inflating them with oxygen contained in the frame when the ambient pressure falls below a selected threshold value, and a third valve means connected to the frame; and a second hose connected between the third valve means and a breathing apparatus for furnishing a wearer with emergency oxygen contained in the frame.

* * * * *

UNITED STATES PATENT AND TRADEMARK OFFICE
CERTIFICATE OF CORRECTION

PATENT NO. : 5,072,727

DATED : December 17, 1991

INVENTOR(S) : Armand J. Aronne

It is certified that error appears in the above-identified patent and that said Letters Patent is hereby corrected as shown below:

Column 2, line 14, change "indication" to --indicated--.

Column 5, line 9, change "thereof" to --thereto--.

Signed and Sealed this

Fourth Day of May, 1993

Attest:

MICHAEL K. KIRK

*Attesting Officer*   *Acting Commissioner of Patents and Trademarks*